(12) United States Patent
Brown

(10) Patent No.: US 7,882,078 B2
(45) Date of Patent: Feb. 1, 2011

(54) METHOD FOR PRESERVING VIRTUAL FILESYSTEM INFORMATION ACROSS HIGH AVAILABILITY TAKEOVER

(75) Inventor: William B. Brown, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/683,622

(22) Filed: Jan. 7, 2010

(65) Prior Publication Data

US 2010/0106755 A1    Apr. 29, 2010

Related U.S. Application Data

(62) Division of application No. 11/750,400, filed on May 18, 2007, now Pat. No. 7,680,844.

(51) Int. Cl.
    *G06F 17/00* (2006.01)
(52) U.S. Cl. ...................................... 707/674
(58) Field of Classification Search ............... 707/674
    See application file for complete search history.

(56) References Cited

U.S. PATENT DOCUMENTS 4,887,204 A * 12/1989 Johnson et al. .............. 1/1
5,603,019 A    2/1997  Kish
5,758,334 A    5/1998  Knight et al.
6,047,294 A    4/2000  Deshayes et al.
6,185,574 B1   2/2001  Howard et al.
6,714,953 B2   3/2004  Grubbs et al.
2003/0177107 A1 9/2003 Brown et al.

OTHER PUBLICATIONS

Wikipedia, AIX, Retrieved Oct. 2, 2009, Section titled Versions, 8 pages.
Srinivasan, "Developing a File System for AIX", May 27, 2007, 17 pages.

* cited by examiner

*Primary Examiner*—James Trujillo
*Assistant Examiner*—William Spieler
(74) *Attorney, Agent, or Firm*—Yee & Associates, P.C.; Justin M. Dillon

(57) ABSTRACT

A computer implemented method, apparatus, and computer usable program code for preserving a virtual file system. Data for a virtual file system is received. The data include file handle information, vnode information, and gnode information. The data is saved to a storage device. The saved data can be used to reconstruct the virtual file system upon changeover between a primary data processing system and a backup data processing system.

6 Claims, 4 Drawing Sheets

METHOD FOR PRESERVING VIRTUAL FILESYSTEM INFORMATION ACROSS HIGH AVAILABILITY TAKEOVER

This application is a divisional of application Ser. No. 11/750,400, filed May 18, 2007, status allowed.

BACKGROUND OF THE INVENTION

1. Field of the Invention

The present invention relates generally to an improved data processing system and in particular to a method and apparatus for preserving virtual file system information. Still more particularly, the present invention relates to a computer implemented method, apparatus, and a computer usable program product for preserving virtual file system information when a backup server takes over operations from a primary server.

2. Description of the Related Art

A network file system provides transparent remote access to file systems. Thus, two computers connected over a network can access each other's files in memory or stored on a storage device. Sharing of files can be restricted, such that only one computer can access the files of a second computer, or limitations can be placed on which files or directories can be accessed. An example of a network file system is NFS Version 4™, available from Sun Microsystems. In this network file system, and on other advanced network file systems, a virtual file system is maintained to provide a path from a root node to exported file systems.

In general, a file system provides a file "map" for a data processing system such that the data processing system can find requested files. File systems for individual data processing systems are often preserved on a hard disk drive. A virtual file system is a file system that is a file "map" of one or more remote computers and/or one or more local computers, singularly or together. Thus, a virtual file system can be a file "map" for an entire network of computers. A virtual file system is therefore also a reflection of one or more physical file systems. A virtual file system is, currently, stored in volatile memory, often of a network file system server.

In a high availability environment, one or more backup data processing systems are used to provide a safety net in case of failure of the primary data processing system or systems. For example, if the primary data processing system fails, then the one or more backup data processing systems can seamlessly take over operations formerly performed by the primary data processing system. If the primary data processing system is supporting a virtual file system in a network file system, then problems arise when transferring the virtual file system from the primary data processing system to the backup data processing system.

For example, either volatile file handles must be used or the file handles for the nodes of the virtual file system must be preserved during the transfer of operations from the primary data processing system to the backup data processing system. A file handle is a pointer to a data structure. Volatile file handles are file handles stored in a volatile memory.

Volatile file handles present a performance degradation to clients that access the backup data processing system. Unless the involved directories of the physical file system corresponding to the backup file system each have identical attributes, the file handles will not be saved or accessible. In practice, these file systems do not have identical attributes. Therefore, difficulties arise when transferring support of the virtual file system from a primary data processing system to a backup data processing system, which in part may defeat the purpose of the high availability backup data processing system.

SUMMARY OF THE INVENTION

Exemplary illustrative embodiments provide for a computer implemented method, apparatus, and computer usable program code for preserving a virtual file system. Data for a virtual file system is received. The data include file handle information, vnode information, and gnode information. The data is saved to a storage device.

In another illustrative embodiment, a determination whether a directory has been exported is made. Responsive to the directory being exported, second data is received for the exported directory. The second data include file handle information for the exported directory, vnode information for the exported directory, and gnode information for the exported directory. Again, the data is saved to a storage device. The data can further include at least one of a hold command, a release command, a get attribute command, a file identification, a file system identification, and lookup vnode information.

In yet another illustrative embodiment, a method is provided for looking up a child directory in a virtual file system. A determination is made whether the child directory exists. The child directory is constructed from data stored in a storage device. The data corresponds to information regarding a first virtual file system. Responsive to a determination that the child directory exists, the child directory is returned to form a found child directory. The found child directory is stored in a storage device.

In still another illustrative embodiment, a determination is made whether the child directory does not exist. If the child directory does not exist, the child directory is created to form a created child directory. The created child directory is returned and stored in a storage device.

Additionally, a determination can be made whether the child directory is marked as being exported. Responsive to the child directory being marked as exported, the child directory is returned as the found child directory.

Furthermore, a determination can be made whether the child directory is marked as being exported. Responsive to one of the child directory not being marked as exported and the child directory being marked as not exported, a file system identification attribute and a file identification attribute of the child directory are used to find a corresponding physical directory in a physical file system. The corresponding physical directory is returned as the found child directory.

Still further, a determination can be made whether at least one additional child directory exists. The at least one additional child directory is constructed from data stored in a storage device. Responsive to a determination that the at least one additional child directory exists, the at least one additional child directory is returned to form a second found child directory and the second found child directory is stored in a storage device.

Yet additionally, a determination can be made whether the child directory does not exist. If the child does not exist, then the child directory is created to form a created child directory. The created child directory is returned and stored in a storage device. A determination is made whether the child directory is marked as being exported. Responsive to the child directory being marked as exported, the child directory is returned as the found child directory. Responsive to one of the child directory not being marked as exported and the child directory being marked as not exported, a file system identification attribute and a file identification attribute of the child directory are used to find a corresponding physical directory in a physical file system and the corresponding physical directory is returned as the found child directory.

Building on this example, the first virtual file system had been supported by a currently non-functional data processing system. In this case, each step can be repeated until a second virtual file system is constructed. The second virtual file system corresponds to the first virtual file system.

Further building on this example, the second virtual file system is supported by a backup data processing system.

In another illustrative embodiment, the nodes of the virtual file system have file handle information and the file handle information are based on physical file system nodes. The file handles can be stored in a storage device.

In yet another illustrative embodiment, a computer implemented method of implementing a change over from a primary data processing system to a backup data processing system in a network file system environment is provided. Responsive to the change over, a virtual root node is created in a virtual file system supported by the backup data processing system. The root node is created from data stored on a storage device. A path is looked up for entry of a virtual child node of the virtual file system. A file system identification, a file identification, and export information are applied to the virtual child node. The file system identification, file identification, and export information are stored on the storage device. The virtual child node is created and stored in a memory.

Building on this example, the illustrative embodiment can further include determining whether at least one additional node should exist in the virtual file system. The virtual file system is reconstructed by performing additional lookups of the at least one additional node by using the file system identification, the file identification, and the export information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
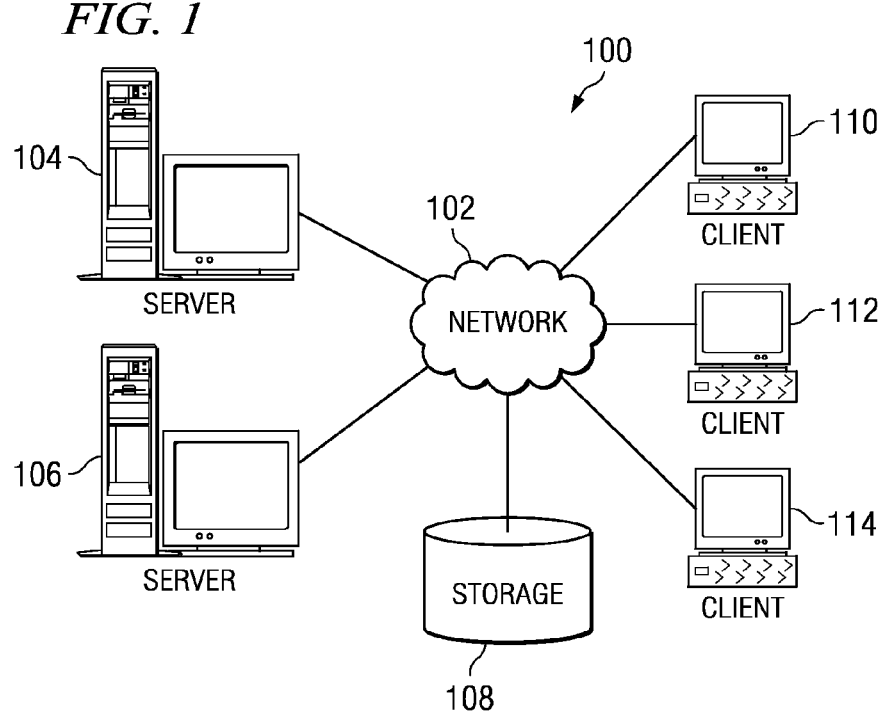
FIG. 1 is a pictorial representation of a network of data processing systems in which illustrative embodiments may be implemented.
Figure 2:
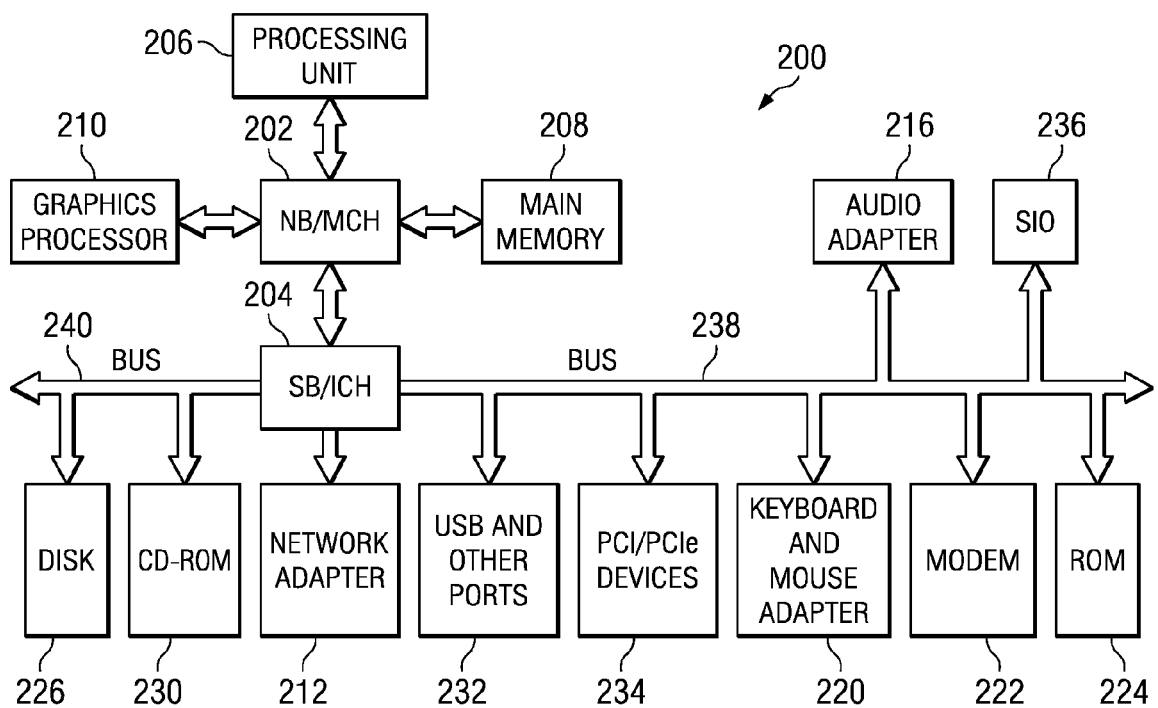
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary illustrative embodiments provide for a computer implemented method, apparatus, and computer usable program code for a computer implemented method, apparatus, and computer usable program code for preserving a virtual file system. Data for a virtual file system is received. The data include file handle information, vnode information, and gnode information. The data is saved to a storage device. The saved data can be used to reconstruct the virtual file system upon changeover between a primary data processing system and a backup data processing system.

The illustrative embodiments described herein can be implemented using a virtual file system, such as that shown in FIG. 3 below. Thus, the illustrative examples provide a method of more seamlessly transferring operations from a primary data processing system to a backup data processing system, wherein both data processing systems are intended to support a virtual file system.

Figure 3:
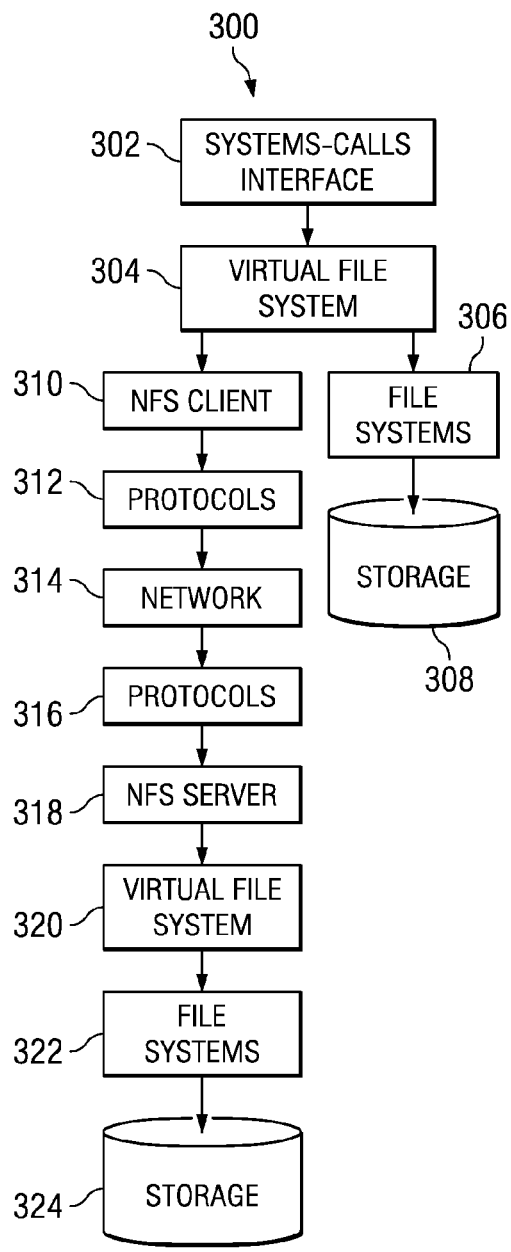
FIG. 3 is a block diagram representing a prior art architecture of a network file system in which the illustrative embodiments may be implemented.

FIG. 3 is a block diagram representing a prior art architecture of a network file system in which the illustrative embodiments may be implemented. The prior art network file system shown in FIG. 3 can be implemented in a data processing system, such as servers 104 or 106, or clients 110, 112 and 114 shown in FIG. 1, or data processing system 200 shown in FIG. 2. Specifically, the network file system 300 shown in FIG. 3 illustrates how remote data processing systems can access files stored on physical storage systems that are located at distinct geographical locations.

Network file system 300 includes systems-calls interface 302. Systems-calls interface 302 is an interface through which a user can communicate requests to the network file system 300. For example, a user may request that a file be retrieved from a storage device of a remote data processing system. Likewise, systems-calls interface 302 can be used to perform a wide variety of operations with respect to a physical file system on a remote data processing system.

Systems-calls interface 302 communicates with virtual file system 304. Virtual file system 304 is maintained in a volatile memory of a data processing system. A virtual file system is a reflection of one or more physical file systems such as file systems 306. File systems 306 can be one or more potentially disparate file systems used by one or more potentially disparate operating systems. File systems 306 communicate with storage 308, which is a physical storage device containing one or more files and directories. File systems 306 can be used to look up files on storage 308.

Virtual file system 304 also communicates with network file system client 310. Network file system client 310 is a data processing system through which a user can access, retrieve, or otherwise manipulate a file in a remote data processing system. Network file system client 310 is used to support virtual file system 304. Network file system client 310 uses protocols 312 to communicate over a network 314 via a second set of protocols 316 that in turn, allow communication with a second network file system server 318. Protocols 312 and 316 can be any number of known protocols, such as remote procedure call (RPC) and/or external data representation (XDR). Network 314 can be any network, such as network 102 shown in FIG. 1.

Network file system server 318 communicates with and supports virtual file system 320. Virtual file system 320 communicates with file systems 322 in a manner similar to the manner in which virtual file system 304 communicates with file systems 306. File systems 322 in turn communicate with storage 324. Storage 324 is in a remote geographical location compared to storage 308. Thus, systems-calls interface 302 can be used, through network file system client 310 and network file system server 318 to access storage 324.

As described above, in a high availability environment in which one or more backup network file system servers exist, problems can arise when a changeover occurs from a primary network file system server to a backup network file system server. For example, performance degradation at the client can occur when volatile file handles are used. Additionally, loss of virtual file system information can occur.

Figure 4:
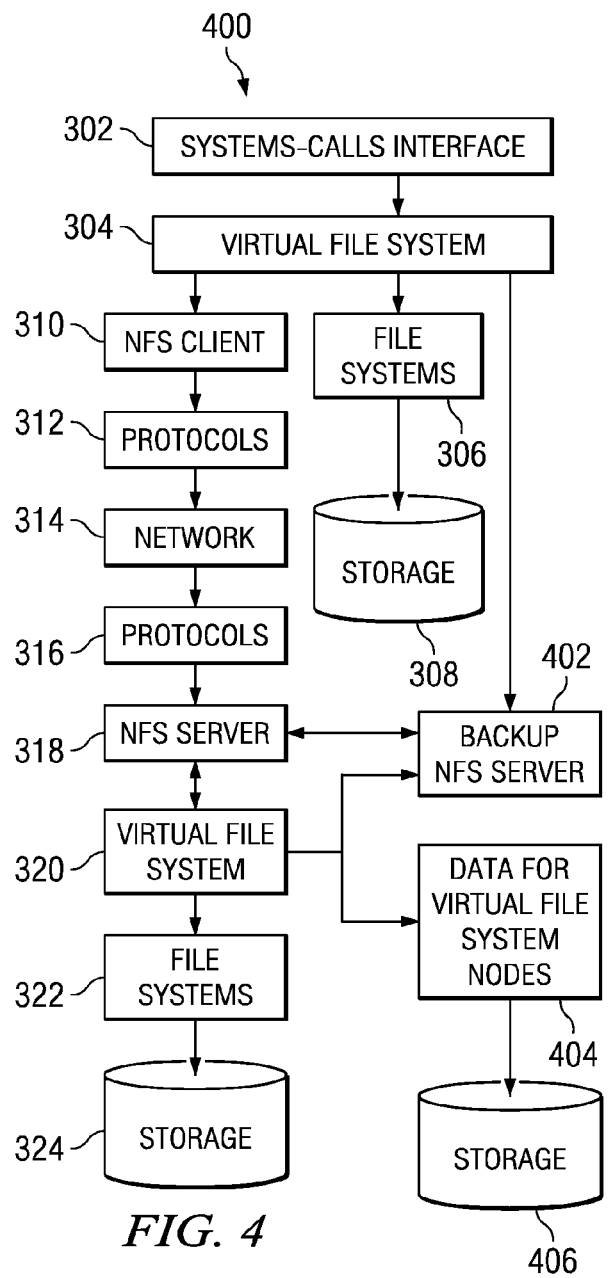
FIG. 4 is a block diagram of an architecture of a network file system wherein file system information is stored to a storage device in accordance with an illustrative embodiment.

FIG. 4 is a block diagram of an architecture of a network file system wherein file system information is stored to a storage device in accordance with an illustrative embodiment. Network file system 400 shown in FIG. 4 can be implemented using one or more data processing systems such as servers 104 or 106, or clients 110, 112, or 114 shown in FIG. 1, or data processing system 200 shown in FIG. 2. Network file system 400 is similar to network file system 300. Therefore, similar reference numerals in FIG. 4 correspond to the same reference numerals in FIG. 3.

Unlike network file system 300, network file system 400 includes backup network file system server 402. Backup network file system server 402 operates in conjunction with network file system server 318 to create a high availability environment. High availability environment means that both backup network file system server 402 and network file system server 318 communicate with virtual file system 320, so that if network file system server 318 fails, backup network file system server 402 can immediately and seamlessly take over support of virtual file system 320.

In order to accomplish this goal, data for nodes of virtual file system 404 is saved from virtual file system 320 to storage 406. Specifically, data for nodes of virtual file system 404 are saved to a stable storage. The saved data is updated after each export or un-export event in virtual file system 320. In an illustrative embodiment, only the nodes in the file system tree providing the path to the exported nodes are used because nodes of virtual file system 404 further down the tree will not be required. Nodes of virtual file system 404 further down the tree will not be required because they are mirrored by the physical file system taken over by the backup server. The data stored for each node includes information needed to construct a corresponding file handle which includes a file system identification, an inode and generation numbers.

During a changeover from network file system server 318 to backup network file system server 402, the saved data is read and in-memory nodes are created to act as the physical file system. Each node uses the file handle information, as well as a vnode and gnode. Vnodes and gnodes are data structures internal to an operating system that describe a file. A vnode describes a file as an object in a file system. A gnode describes a file as an object that can store or retrieve data. Each of these files are directories in a file system whether the file system is virtual or corresponding to a file system on a physical storage device.

As the virtual file system is reconstructed, these nodes are used instead of the physical file system. Because the file handle information for the nodes of the virtual file system are based on the covered physical file system nodes, the file handles can be saved to a storage device.

For each node, the file system identification and file identification structures for the original physical file system node are stored. A flag or marker is also stored to indicate whether a node is an exported node. In this environment, the hold and release vnode operations can be "no operations" Because the in-memory nodes will not be deleted or otherwise destroyed while the network file system server is making the file system available to clients.

The file identification vnode operation returns the saved file identification structure. The get attribute vnode operation leaves the inode number for the file identification as the serial number in the file system identification. Other attribute fields can be specified as desired.

In an illustrative embodiment, the lookup vnode operation can be used to reconstruct a virtual file system from file system data stored on a storage device. When looking up the child of an in memory node constructed from file system data on the storage device, the following process can be used. If the child node does not exist, then the child node is created. The new child is returned as the result. The new child is then stored in the virtual file system. If the child node exists and the child node is not marked as an exported directory, then the child node is returned and stored in the virtual file system. If the file exists and the child node is marked as an exported directory, then the stored file system identification information stored is used with the child node to find the corresponding file in the corresponding physical file system. That corresponding file is returned as the new node in the virtual file system.

When the node information is read, the node tree is constructed as a side effect of the lookup operations. After each lookup, the node is updated with the file handle information. Later, when directories are exported, the virtual file system will mirror the physical file system of the original file system server and the lookups will direct the export code to the correct directories in the physical file system.

Figure 5:
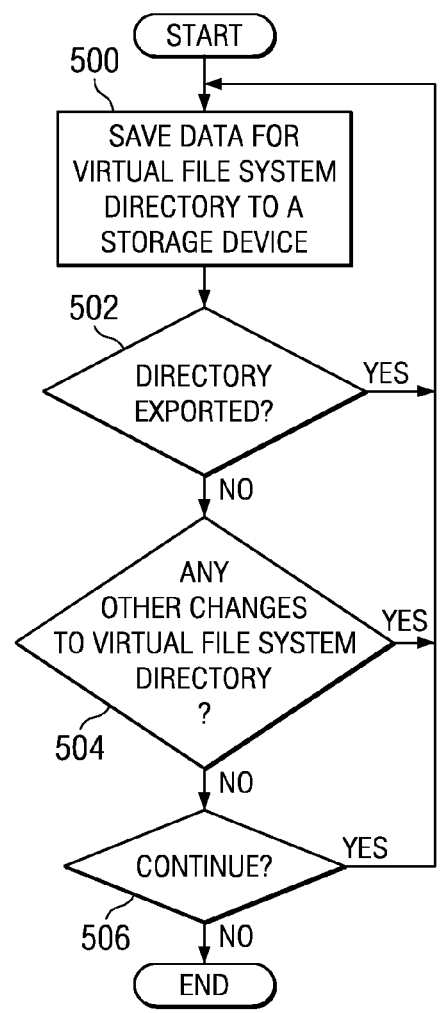
FIG. 5 is a flow chart illustrating a process of saving information related to a virtual file system in accordance with an illustrative embodiment.

FIG. 5 is a flow chart illustrating a process of saving information related to a virtual file system in accordance with an illustrative embodiment. The method shown in FIG. 5 can be implemented in data processing system, such as servers 104 or 106, or clients 110, 112 or 114 shown in FIG. 1, or data processing system 200 shown in FIG. 2. Specifically, the process shown in FIG. 5 can be implemented in a network file system using a network file system server, such as network file system server 318 in FIG. 3, or backup network file system server 402 shown in FIG. 4. Either the network file system server 318 or the backup network file system server 402 can be referred to as a network file system server with respect to the method shown in FIG. 5.

The process begins as the network file system server saves data for a virtual file system directory to a storage device (step 500). The network file system server then determines whether the directory is exported (step 502). If the directory is exported, then the process returns to step 500 where the additional data is again stored.

However, if the directory is not exported, then the network file system server determines whether any other changes have occurred to a virtual file system directory (step 504). If other changes have occurred, then the process returns to step 500 where such changes can be stored in the storage device.

If no changes have occurred to the virtual file system directory, then the network file system server determines whether to continue the data saving operation (step 506). If the data saving operation is continued, then the process returns to step 500 and repeats. Otherwise, the process terminates.

Figure 6:
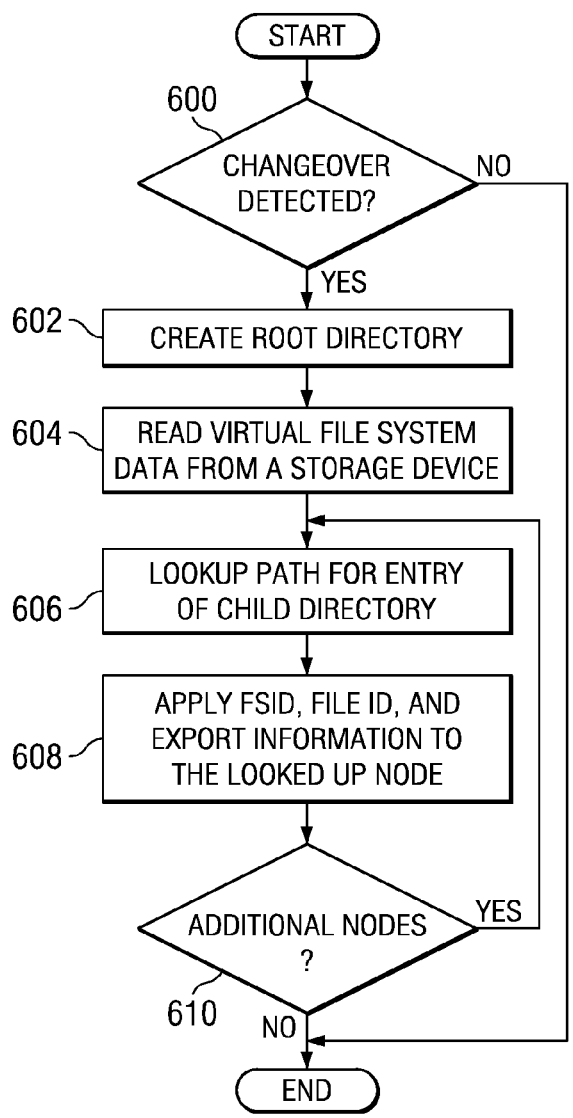
FIG. 6 is a flow chart illustrating a process of changing over support of a virtual file system from a primary data processing system to a backup data processing system in accordance with an illustrative embodiment.

FIG. 6 is a flow chart illustrating a process of changing over support of a virtual file system from a primary data processing system to a backup data processing system in accordance with an illustrative embodiment. The process shown in FIG. 6 can be implemented in a data processing system, such as servers 104 or 106, or clients 110, 112 or 114 shown in FIG. 1, or data processing system 200 shown in FIG. 2. Specifically, the process shown in FIG. 6 can be implemented in a network file system. The process shown in FIG. 6 can be implemented using a network file system server, and in particular, by using a backup network file system server.

The process begins as the backup network file system server determines whether a changeover is detected (step 600). A changeover is an occurrence where one or more primary network file system servers are off-line and one or more backup network file system servers take over operation of the virtual file system. If no changeover is detected, then the process terminates.

If a changeover is detected, then the backup network file system server creates a root directory (step 602). A root directory is a root directory in a virtual file system. The backup network file system server then reads virtual file system data from a storage device (step 604). Virtual file system data can include file handle information, vnode and gnode information, file system identification information, file identification information, and various operational commands, such as hold, release, get attribute, and lookup. Such virtual file system data and their uses are described with respect to FIG. 4.

The backup network file system server then looks up a path for an entry of a child directory (step 606). A backup network file system server then applies file system identification information, file identification information, and export information to the looked up node (step 608). The backup network file system server then determines whether additional nodes are to be looked up. If additional nodes are to be looked up, then the process returns to step 606 and repeats. Otherwise, the process terminates.

The process shown in FIG. 6 can be used to reconstruct an entire virtual file system from virtual file system data stored on a storage device. The process can be repeated as desired in order to accomplish this goal.

Figure 7:
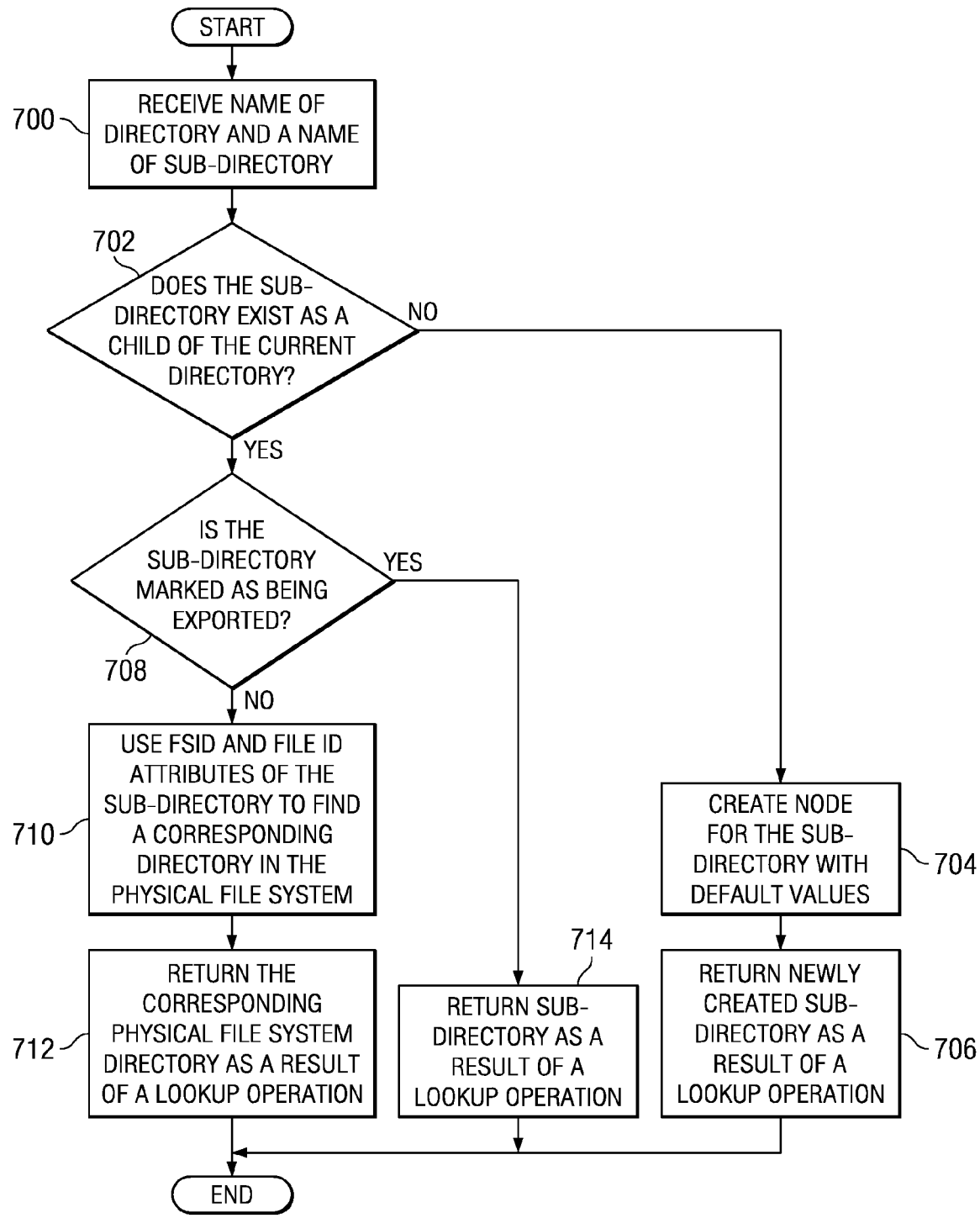
FIG. 7 is a flow chart illustrating a process of looking up a child directory of a virtual file system that has been stored on a storage device in accordance with an illustrative embodiment.

FIG. 7 is a flow chart illustrating a process of looking up a child directory of a virtual file system that has been stored on a storage device in accordance with an illustrative embodiment. The process shown in FIG. 7 can be implemented in a data processing system, such as servers 104 or 106, or clients 110, 112 or 114 shown in FIG. 1, or data processing system 200 shown in FIG. 2. Specifically, the process shown in FIG. 7 can be implemented in a virtual file system network. Still more particularly, the process shown in FIG. 7 can be implemented using a backup network file system server, such as backup network file system server 402 shown in FIG. 4.

The process begins as the backup network file system server receives a name of a directory and a name of a sub-directory (step 700). The backup network file system server then determines whether the sub-directory exists as a child of the current directory (step 702). If the subdirectory does not exist as a child of the current directory, then the network file system server creates a node for the sub-directory using default attributes (step 704). As described above, a node is a directory. A backup network file system server then returns the newly created sub-directory as a result of a lookup operation (step 706). The process terminates thereafter.

Returning to step 702, if the backup network file system server determined that the sub-directory does exist as a child of the current directory, then the backup network file system server determines if the sub-directory is marked as being exported (step 708). If the sub-directory is not marked as being exported, then the backup network file system server uses a file system identification and file identification attributes of the sub-directory to find a corresponding directory in the physical file system (step 710). The backup network file system server then returns the corresponding physical file system directory as a result of a lookup operation (step 712). The process terminates thereafter.

Returning to step 708, If the sub-directory is marked as being exported, then the backup network file system server returns the sub-directory as the result of a lookup operation (step 712). The process terminates thereafter.

Thus, the exemplary illustrative embodiments provide for a computer implemented method, apparatus, and computer usable program code for a computer implemented method, apparatus, and computer usable program code for preserving a virtual file system. Data for a virtual file system is received. The data include file handle information, vnode information, and gnode information. The data is saved to a storage device. The saved data can be used to reconstruct the virtual file system upon changeover between a primary data processing system and a backup data processing system.

The illustrative embodiments described herein provide a mechanism to avoid the drawbacks of changing over from a primary network file system server to a backup network file system server in a high availability environment. For example, performance degradation in a client resulting from volatile file handles is avoided. Thus, clients experience a more seamless and faster transition between the backup network file system server and the primary network file system server. In fact, the client is unlikely to experience any performance degradation resulting from the change in which network file system server supports the virtual file system.

The invention can take the form of an entirely hardware embodiment, an entirely software embodiment, or an embodiment containing both hardware and software elements. In a preferred embodiment, the invention is implemented in software, which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of implementing a change over from a primary data processing system to a backup data processing system in a network file system environment, the method comprising:
    responsive to the change over:
        creating a virtual root node in a virtual file system supported by the backup data processing system, wherein the root node is a created from data stored on a storage device;
        looking up a path for entry of a virtual child node of the virtual file system;
        applying a file system identification, a file identification, and export information to the virtual child node, wherein the file system identification, file identification, and export information are stored on the storage device;
        creating the virtual child node; and
        storing the virtual child node in a memory.

2. The computer implemented method of claim 1 further comprising:
    determining whether at least one additional node should exist in the virtual file system; and
    reconstructing the virtual file system by performing additional lookups of the at least one additional node by using the file system identification, the file identification, and the export information.

3. A computer program product comprising:
    a computer usable medium having computer usable program code for implementing a change over from a primary data processing system to a backup data processing system in a network file system environment, the computer program product including:
    responsive to the change over:
        computer usable program code for creating a virtual root node in a virtual file system supported by the backup data processing system, wherein the root node is a created from data stored on a storage device;
        computer usable program code for looking up a path for entry of a virtual child node of the virtual file system;
        computer usable program code for applying a file system identification, a file identification, and export information to the virtual child node, wherein the file system identification, file identification, and export information are stored on the storage device;
        computer usable program code for creating the virtual child node; and
        computer usable program code for storing the virtual child node in a memory.

4. The computer program product of claim 3 further comprising:
    computer usable program code for determining whether at least one additional node should exist in the virtual file system; and
    computer usable program code for reconstructing the virtual file system by performing additional lookups of the at least one additional node by using the file system identification, the file identification, and the export information.

5. A data processing system comprising:
    a processor;
    a bus connected to the processor;
    a computer usable medium connected to the bus, wherein the computer usable medium contains a set of instructions for implementing a change over from a primary data processing system to a backup data processing system in a network file system environment, wherein the processor is adapted to carry out the set of instructions responsive to the change over to:
    create a virtual root node in a virtual file system supported by the backup data processing system, wherein the root node is a created from data stored on a storage device;
    look up a path for entry of a virtual child node of the virtual file system;
    apply a file system identification, a file identification, and export information to the virtual child node, wherein the file system identification, file identification, and export information are stored on the storage device;
    create the virtual child node; and
    store the virtual child node in a memory.

6. The data processing system of claim 5 wherein the processor is adapted to further carry out the set of instructions to:
    determine whether at least one additional node should exist in the virtual file system; and
    reconstruct the virtual file system by performing additional lookups of the at least one additional node by using the file system identification, the file identification, and the export information.

* * * * *